(12) United States Patent
Richardson

(10) Patent No.: US 8,152,352 B2
(45) Date of Patent: Apr. 10, 2012

(54) OPTIC SYSTEM FOR LIGHT GUIDE WITH CONTROLLED OUTPUT

(75) Inventor: Brian Edward Richardson, Morgan Hill, CA (US)

(73) Assignee: Rambus International Ltd., Grand Cayman (KY)

( * ) Notice: Subject to any disclaimer, the term of this patent is extended or adjusted under 35 U.S.C. 154(b) by 42 days.

(21) Appl. No.: 12/319,172

(22) Filed: Jan. 2, 2009

(65) Prior Publication Data

US 2010/0085773 A1    Apr. 8, 2010

(51) Int. Cl.
*F21V 7/04* (2006.01)

(52) U.S. Cl. ........ 362/615; 362/616; 362/623; 362/624; 362/626

(58) Field of Classification Search ................. 362/615, 362/612, 613, 623, 607, 616, 624, 626, 610, 362/609; 349/62
See application file for complete search history.

(56) References Cited

U.S. PATENT DOCUMENTS

| | | |
|---|---|---|
| 223,898 A | 1/1880 | Edison |
| 2,673,923 A | 3/1954 | Williams |
| 2,971,083 A | 2/1961 | Phillips et al. |
| 4,172,631 A | 10/1979 | Yevick |
| 4,392,187 A | 7/1983 | Bornhorst |
| 4,566,935 A | 1/1986 | Hornbeck |
| 4,596,992 A | 6/1986 | Hornbeck |
| 4,615,595 A | 10/1986 | Hornbeck |
| 4,662,746 A | 5/1987 | Hornbeck |
| 4,710,732 A | 12/1987 | Hornbeck |
| 4,956,619 A | 9/1990 | Hornbeck |
| 4,972,306 A | 11/1990 | Bornhorst |
| 5,028,939 A | 7/1991 | Hornbeck et al. |
| 5,083,252 A | 1/1992 | McGuire |
| 5,126,886 A | 6/1992 | Richardson et al. |
| 5,217,285 A | 6/1993 | Sopori |
| 5,221,987 A | 6/1993 | Laughlin |
| 5,319,491 A | 6/1994 | Selbrede |
| 5,396,350 A | 3/1995 | Beeson |
| 5,467,208 A | 11/1995 | Kokawa et al. |
| 5,631,895 A | 5/1997 | Okada et al. |
| 5,825,548 A | 10/1998 | Bornhorst et al. |
| 5,936,772 A | 8/1999 | Suzuki |
| 5,953,469 A | 9/1999 | Zhou |
| 6,040,937 A | 3/2000 | Miles |
| 6,048,081 A | 4/2000 | Richardson |

(Continued)

FOREIGN PATENT DOCUMENTS

EP    814300 A1    12/1997

(Continued)

OTHER PUBLICATIONS

International Search Report and the Written Opinion with mail date of Feb. 18, 2011, re Int'l Application No. PCT/US2010/0001673.

(Continued)

*Primary Examiner* — Evan Dzierzynski
(74) *Attorney, Agent, or Firm* — Carr & Ferrell LLP

(57) ABSTRACT

A light guide with optics accurately controls the light exiting the guide. The device achieves accurate control of the reflected light by extracting light from a limited area of the light guide. The configuration of the reflectors used for the selective extraction determines the nature of the output light. The reflectors are preferably located on a side of the light guide opposite to an output side of the light guide.

31 Claims, 9 Drawing Sheets

U.S. PATENT DOCUMENTS

| | | |
|---|---|---|
| 6,350,041 B1 | 2/2002 | Tarsa |
| 6,360,033 B1 | 3/2002 | Lee et al. |
| 6,421,103 B2 | 7/2002 | Yamaguchi |
| 6,438,283 B1 | 8/2002 | Karaguleff et al. |
| 6,497,946 B1 | 12/2002 | Kretman et al. |
| 6,502,961 B1 | 1/2003 | Richardson |
| 6,565,233 B1 | 5/2003 | Richardson |
| 6,595,652 B2 | 7/2003 | Oda et al. |
| 6,618,113 B1 | 9/2003 | Ulrich et al. |
| 6,674,562 B1 | 1/2004 | Miles |
| 6,729,734 B2 | 5/2004 | Childers et al. |
| 6,768,572 B2 | 7/2004 | Romanovsky |
| 6,771,325 B1 | 8/2004 | Dewald et al. |
| 6,824,270 B2 | 11/2004 | Kim et al. |
| 6,867,896 B2 | 3/2005 | Miles |
| 6,924,945 B1 | 8/2005 | Richardson |
| 6,974,232 B1 | 12/2005 | Richardson |
| 7,080,932 B2 | 7/2006 | Keuper |
| 7,084,941 B2 | 8/2006 | Suen et al. |
| 7,123,216 B1 | 10/2006 | Miles |
| 7,142,744 B2 | 11/2006 | Walter et al. |
| 7,144,131 B2 | 12/2006 | Rains |
| 7,177,498 B2 | 2/2007 | Cizek |
| 7,286,296 B2 | 10/2007 | Chaves et al. |
| 7,345,824 B2 | 3/2008 | Lubart |
| 7,380,962 B2 | 6/2008 | Chaves et al. |
| 7,447,397 B1 | 11/2008 | Maki et al. |
| 7,499,206 B1 | 3/2009 | Richardson |
| 7,537,372 B2 | 5/2009 | Sugimoto et al. |
| 8,004,763 B2 | 8/2011 | Lee et al. |
| 2002/0031294 A1 | 3/2002 | Takeda et al. |
| 2002/0044720 A1 | 4/2002 | Brophy et al. |
| 2002/0105709 A1 | 8/2002 | Whitehead et al. |
| 2004/0076396 A1 | 4/2004 | Suga |
| 2004/0109105 A1 | 6/2004 | Nagakubo |
| 2004/0207775 A1 | 10/2004 | Min et al. |
| 2005/0018147 A1 | 1/2005 | Lee |
| 2005/0057731 A1 | 3/2005 | Lee |
| 2005/0190575 A1* | 9/2005 | Hayakawa ............... 362/615 |
| 2005/0221473 A1 | 10/2005 | Dubin et al. |
| 2005/0243570 A1 | 11/2005 | Chaves |
| 2005/0248827 A1 | 11/2005 | Starkweather et al. |
| 2005/0270796 A1 | 12/2005 | Ichikawa |
| 2006/0070379 A1 | 4/2006 | Starkweather et al. |
| 2006/0171167 A1 | 8/2006 | Ohkawa |
| 2007/0176887 A1 | 8/2007 | Uehara |
| 2007/0211487 A1 | 9/2007 | Sormani |
| 2008/0170296 A1 | 7/2008 | Chaves |
| 2009/0064993 A1 | 3/2009 | Ghosh |
| 2009/0116099 A1 | 5/2009 | Richardson |
| 2009/0262368 A1 | 10/2009 | Leong |
| 2010/0085773 A1 | 4/2010 | Richardson |
| 2010/0172138 A1 | 7/2010 | Richardson |
| 2010/0220492 A1 | 9/2010 | Richardson |
| 2010/0315802 A1 | 12/2010 | Richardson |
| 2010/0315836 A1 | 12/2010 | Richardson |
| 2010/0328748 A1 | 12/2010 | Richardson |

FOREIGN PATENT DOCUMENTS

| | | |
|---|---|---|
| EP | 867747 A2 | 9/1998 |
| EP | 0969305 A1 | 1/2000 |
| EP | 0969306 A1 | 1/2000 |
| EP | 1215526 A1 | 6/2002 |
| EP | 2045633 A1 | 4/2009 |
| GB | 663840 A | 12/1951 |
| JP | 02002229017 A | 8/2002 |
| WO | 2004068183 A2 | 8/2004 |
| WO | 2008060335 A1 | 5/2008 |
| WO | 2009024952 A2 | 2/2009 |

OTHER PUBLICATIONS

International Search Report and the Written Opinion with mail date of Feb. 7, 2011, re Int'l Application No. PCT/US2010/0001661.

Information Disclosure Statement with mail date of Mar. 25, 2010, re U.S. Appl. No. 12/319,171.

Information Disclosure Statement with mail date of Sep. 8, 2010, re U.S. Appl. No. 12/319,171.

International Search Report and the Written Opinion with mail date of Mar. 4, 2011, re Int'l Application No. PCT/US2010/0001674.

* cited by examiner

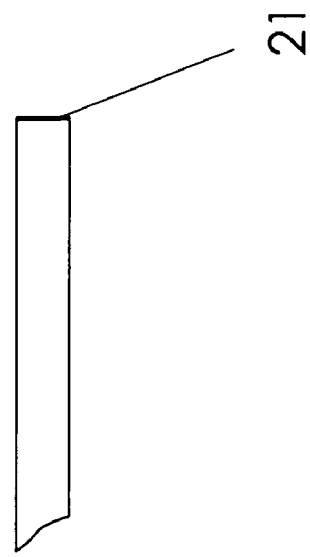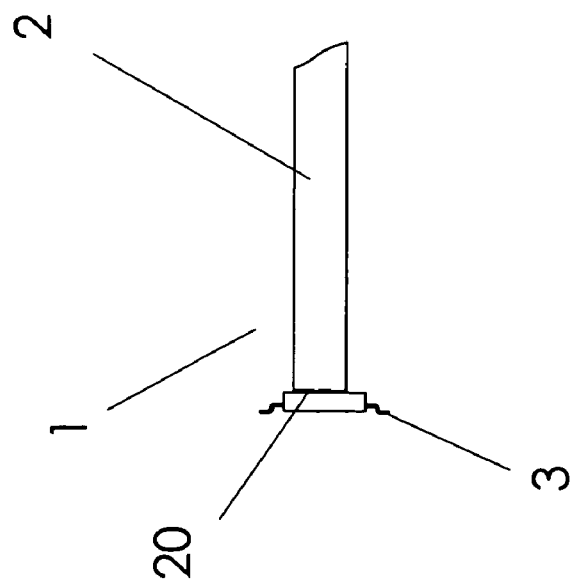
Fig. 5

OPTIC SYSTEM FOR LIGHT GUIDE WITH CONTROLLED OUTPUT

Applicant incorporates by reference herein his co-pending application ATIR Switched Flat Panel Display@, Ser. No. 12/319,171, filed Jan. 2, 2009.

FIELD OF THE INVENTION

This invention relates generally to light display devices, and more particularly is an optical system to control the direction light travels as it exits a light guide.

BACKGROUND OF THE INVENTION

Many products require an optical system to spread light over a large area and control the direction of the light as it exits the system. Recent improvements in the performance of LEDs, coupled with a concurrent reduction in the cost of production, have made LEDs a more viable option for many applications. However, many applications; such as LCD backlights, signs with backlights, overhead lighting, and automotive lighting; require the concentrated light that is generated by an LED to be spread over a large area, while still controlling the direction of the light. These applications require an improved optic system to provide the desired light control.

Displays based on LCD technology have been evolving for decades. Numerous patent references based on improvements to the basic technology are now available. However, current art displays still have several shortcomings. The chief shortcoming of current art devices is excessive energy consumption. A 65" diagonal HDTV LCD TV typically draws around a half of a kilowatt. This is a result of the poor efficiency of the technology.

One way to improve the efficiency of LCD displays is to direct as much as possible of the available light from the light source toward the area most easily seen by the viewer. With a hand held display device, where power consumption is clearly an important consideration, a narrowly angled light directed towards the viewer is desired.

In a standing application, such as a TV, it is desirable to have the highest intensity segment of the light projected in a direction normal to the surface of the display. It is also important to provide a significant amount of light to the left and right of normal. This is required for viewers that are not in the optimal (normal to the screen) viewing position. It is also desirable in these applications to reduce the amount of light that is projected above and below the angel normal to the screen. If the light that is typically directed in the off normal directions is re-directed to the preferred angles, the intensity of the light transmitted in the preferred directions would be greater.

Three groups of prior art references have addressed the control of light to LCD type displays. Among these, prism type "brightness enhancing films" (BEFs), comprise the most common class. One example of a BEF device is U.S. Pat. No. 5,467,208, "Liquid Crystal Display" by Shozo Kokawa, et al., issued Nov. 14, 1995. This reference discusses the prior art of prism type films and discloses improvements to the art. One drawback to prism films is that they have only limited control of the angles of the light output. Changes to the prism features result in only slight variations in the light output. The prism films are also limited to a two dimensional structure. If an application requires control of the light in three dimensions, at least two BEFs must be deployed.

A second class of prior art is exemplified by U.S. Pat. No. 6,421,103, "Liquid Crystal Display Apparatus . . . " by Akira Yamaguchi, issued Jul. 16, 2002. The Yamaguchi reference discloses another device to control light as it enters an LCD panel. The patent discloses light sources, a substrate (not used as a light guide), apertures, and reflective regions on the substrate. The light is either reflected by the reflective surface or passes through the apertures. The light that passes through the apertures is captured by a lens used to control the direction of the light. Yamaguchi teaches restriction of the angle of the output light to concentrate more light directly at the viewer of an LCD type display. The Yamaguchi device provides much greater control of the output light than can be had with a BEF device. But a drawback to the Yamaguchi device is that it is extremely inefficient. Light must reflect off of the reflective surface many times before it exits the aperture. Even when the reflective surface is made with a high reflectance material, the losses in intensity are substantial. Therefore while the control of light with this invention is superior to that of BEF devices, the efficiency is much poorer.

U.S. Pat. No. 5,396,350, "Backlighting Apparatus . . . " by Karl Beeson, issued Mar. 7, 1995; and U.S. Pat. No. 7,345,824, "Light Collimating Device" by Neil Lubart, issued Mar. 18, 2008; disclose devices in the third class of light control optics for LED light source devices. The Beeson and Lubart references disclose a reflective structure on the side of the light guide. The range of control of these reflective structures is limited, and is not equivalent to the control afforded by devices such as Yamaguchi. Further, the reflective structures are positioned very close to the LCD panel, which allows defects in their output to be easily seen by the viewer of the display.

Accordingly, it is an object of the present invention to provide a light guide that is extremely efficient.

It is another object of the present invention to provide a less complex light guide thereby reducing the cost to manufacture.

It is a further object of the present invention to provide a light guide that will provide accurate control of the direction of light output.

SUMMARY OF THE INVENTION

The present invention is an optic system for a light guide that controls the angle of the light as it exits the system. It can be used in many applications from LCD to overhead lighting. The LCD displays are of the type used in cellular phones, laptop computers, computer monitors, TVs and commercial displays. The light guide extracts light from the light guide at discrete points. Using the extraction elements in combination with a reflector, the output light of the device can be controlled to be parallel, divergent or convergent. The reflectors can be two dimensional or three dimensional.

An advantage of the optic system of the present invention is that it accurately controls the angles of the output light.

Another advantage of the optic system of the present invention is that it transmits light more efficiently than prior art devices.

Yet another advantage of optic system of the present invention is that it is simple in construction, and therefore easy and economical to manufacture.

These and other objectives and advantages of the present invention will become apparent to those skilled in the art in view of the description of the best presently known mode of carrying out the invention as described herein and as illustrated in the drawings.

BRIEF DESCRIPTION OF THE DRAWINGS

FIG. 5 is a broken side view of the light guide, LCD, and end reflectors.

DETAILED DESCRIPTION OF THE INVENTION

Figure 1:
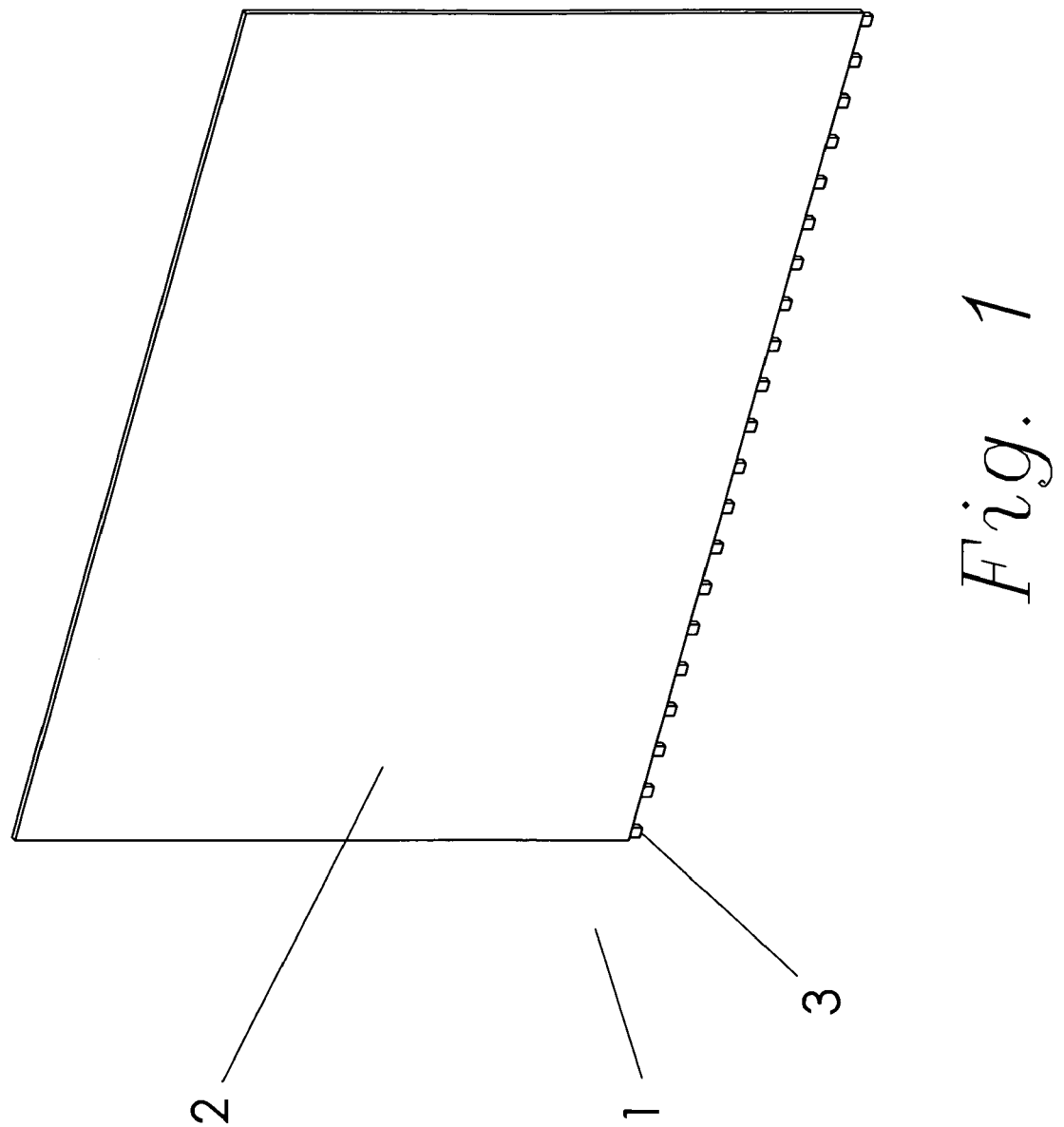
FIG. 1 is a perspective view of the light guide with optics of the present invention.

Referring first to FIG. 1, the light guide assembly 1 of the present invention comprises a light guide 2 with a planar surface and a plurality of LEDs 3. The LEDs 3 are located along a lower edge of the light guide 2. The number of colors of LEDs 3 and the side of the light guide 2 where the LEDs 3 are located would be a function of the size, shape and application of the light guide 2. The LEDs 3 can be situated on more than one side of the light guide 2. The LEDs 3 require electronics to drive them at the proper level. A person knowledgeable in LED driver electronics could devise many different circuits to accomplish this task. The preferred embodiment illustrated in FIG. 1 comprises a total of 27 LEDs 3 shown generally equally spaced along the bottom edge of the light guide 2. It should be recognized that other types of light sources such as incandescent or florescent, will suffice in the place of the LEDs 3.

Figure 2:
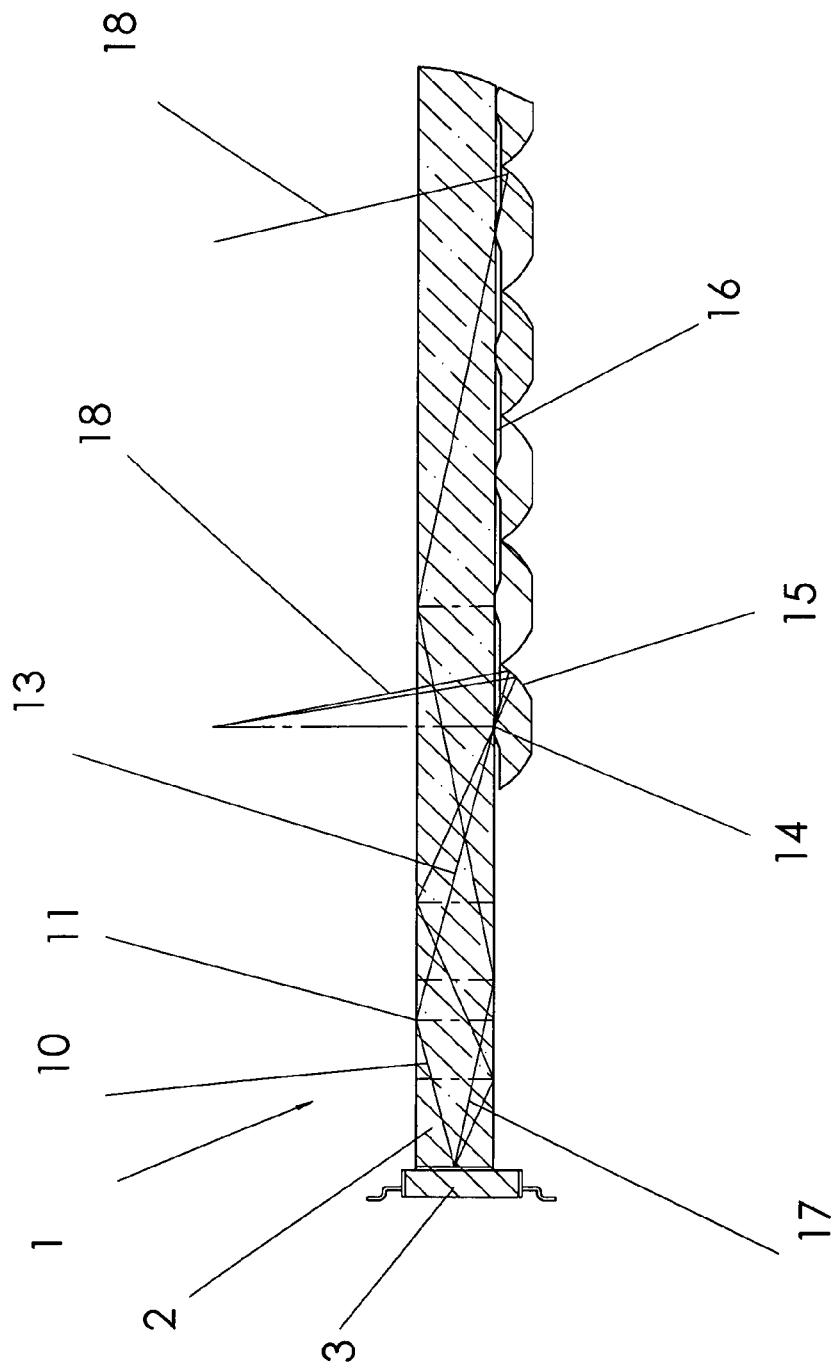
FIG. 2 is a partial, magnified side view of the light guide with optics shown in FIG. 1.

The light guide 2 is shown in a magnified side view in FIG. 2. FIG. 2 shows a sampling of light rays 17 emanating from the LED 3. Upper light ray 10 is depicted as striking the upper surface 11 of the light guide 2. When the contact angle of light ray 10 with the surface of the light guide 2 is shallow, the light reflects off of the surface of the light guide 2. This reflection is governed by the equation:

$$A = \arcsin(Ns/Nlg)$$

Where Nlg is the index of refraction of the light guide

And where Ns is the index of refraction of the medium outside the light guide

A is the angle from normal to the surface of the light guide. The angle of incidence may be defined as 90°−A.

For air or another low index material, Ns would be 1.35 or less. For a plastic or glass light guide 2, Nlg might be 1.5. Angle A for these values is 64°.

If light strikes the surface of the light guide 2 at an angle greater than A, (or less than 90°−A), light will reflect off of the surface, in total internal reflection (TIR). If the angle of incidence is greater than 90°−A, light will pass through the upper light guide surface 11 and would be refracted. In the case stated, the light reflects off the upper light guide surface 11. The upper reflected light 13 continues in a downward direction where it encounters a contact dome 14. The contact dome 14 is preferably the same or greater in index of refraction than the light guide 2. If the indexes of the light guide 2 and the contact dome 14 are the same, the light 13 continues to travel in the same direction. If the indexes of refraction are slightly different, the light 13 is refracted. If the indexes are much different, and the contact dome 14 has a lesser index of refraction, light may again TIR. For most applications, it is undesirable to have any light TIR in the area where the contact dome 14 makes contact with the light guide 2. Selecting a contact dome 14 with an index of refraction greater than that of the light guide 2 insures more complete passage of the light.

The upper reflected light 13 continues through the contact dome 14 and strikes a reflector 15. If the angle at which the light 13 strikes the reflector 15 is not within the TIR range, the surface of the reflector 15 must be coated with a reflective material to reflect the light. The reflective material could be aluminum, silver, a dielectric interference type mirror, or other reflective materials or methods. If the reflector 15 is configured with angles that fall within the stated TIR formula, the reflector 15 need not be coated. The light TIR reflects off the surface of the reflector 15.

Figure 9:
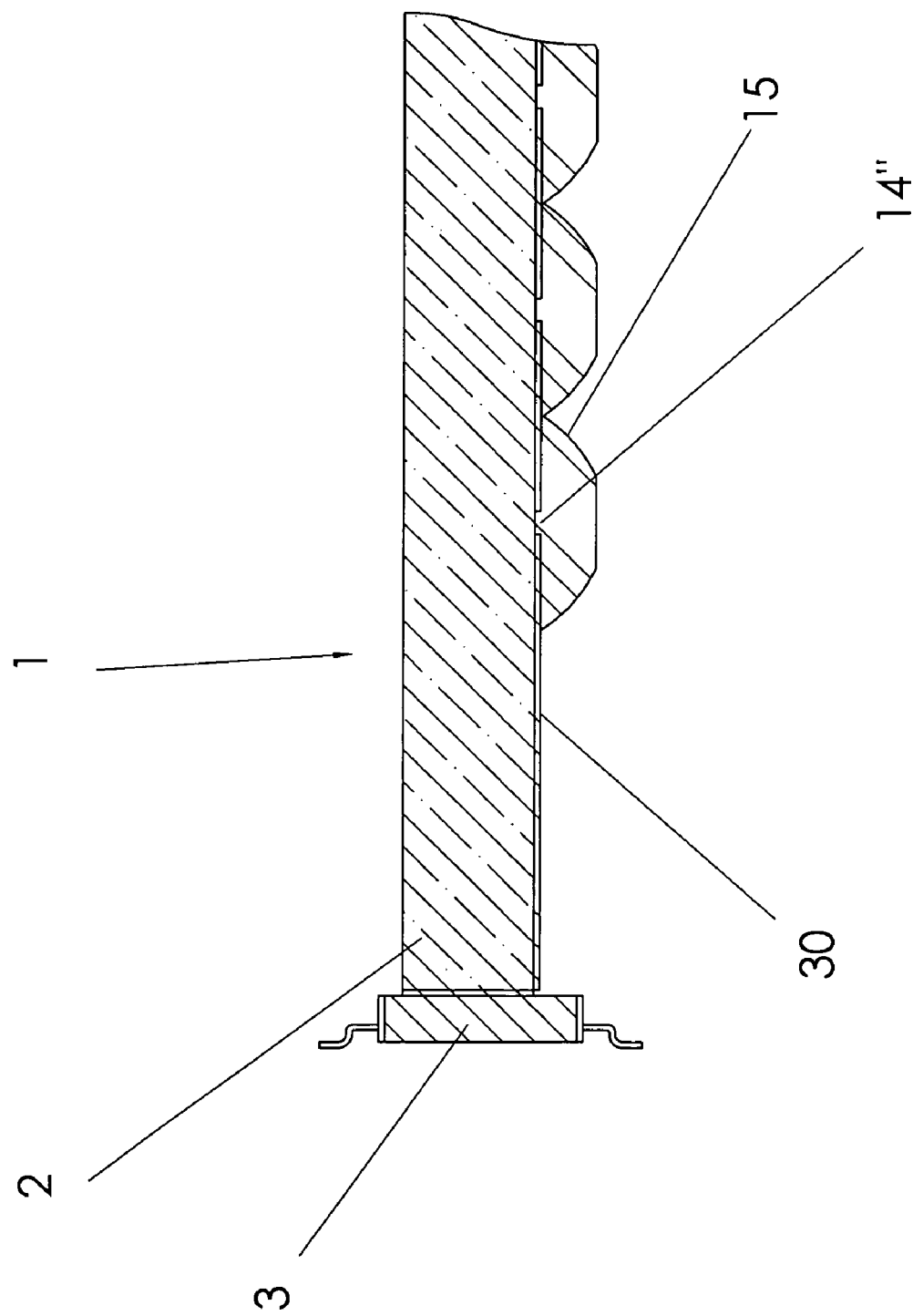
FIG. 9 shows a magnified side view of another construction of the optic system.

It should be noted that in all the configurations disclosed herein, the reflector 15 structures are optically isolated from the light guide 2. In the configuration illustrated in FIG. 2, the isolation is accomplished by providing a slight air gap 16 between the light guide 2 and the structure comprising the reflectors 15. (An alternative method, discussed below with reference to FIG. 9, is to install a layer of a low index material between the light guide 2 and the reflector 15 structure.)

The shape of the reflectors 15 determines the direction the light is reflected and therefore the nature of the output light. FIG. 2 illustrates the reflector 15 as being generally elliptical. An ellipse shaped reflector 15 focuses the light to a point, or causes the light to exit the reflector 15 at multiple angles. If reflector 15 is parabolic shaped, the light exiting the light guide 2 would be generally parallel. It should be noted that if an elliptical reflector or parabolic reflector is chosen, the focal point of the reflectors would most likely be located at the surface, where the contact dome 14 and the light guide 2 meet. Many other shapes could be used for the reflector 15, the choice being dependent on a desired angular output of the light.

Figure 3:
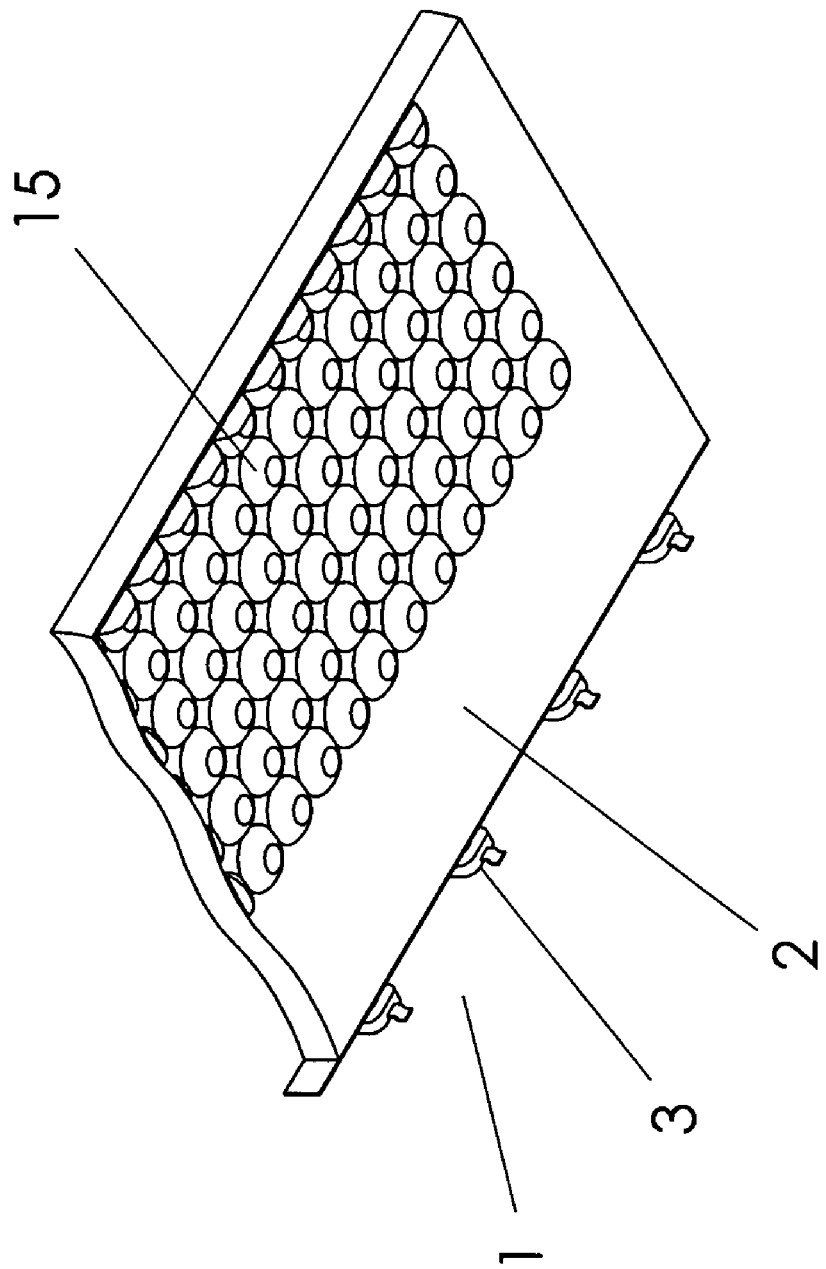
FIG. 3 illustrates three dimensional type reflectors.
Figure 4:
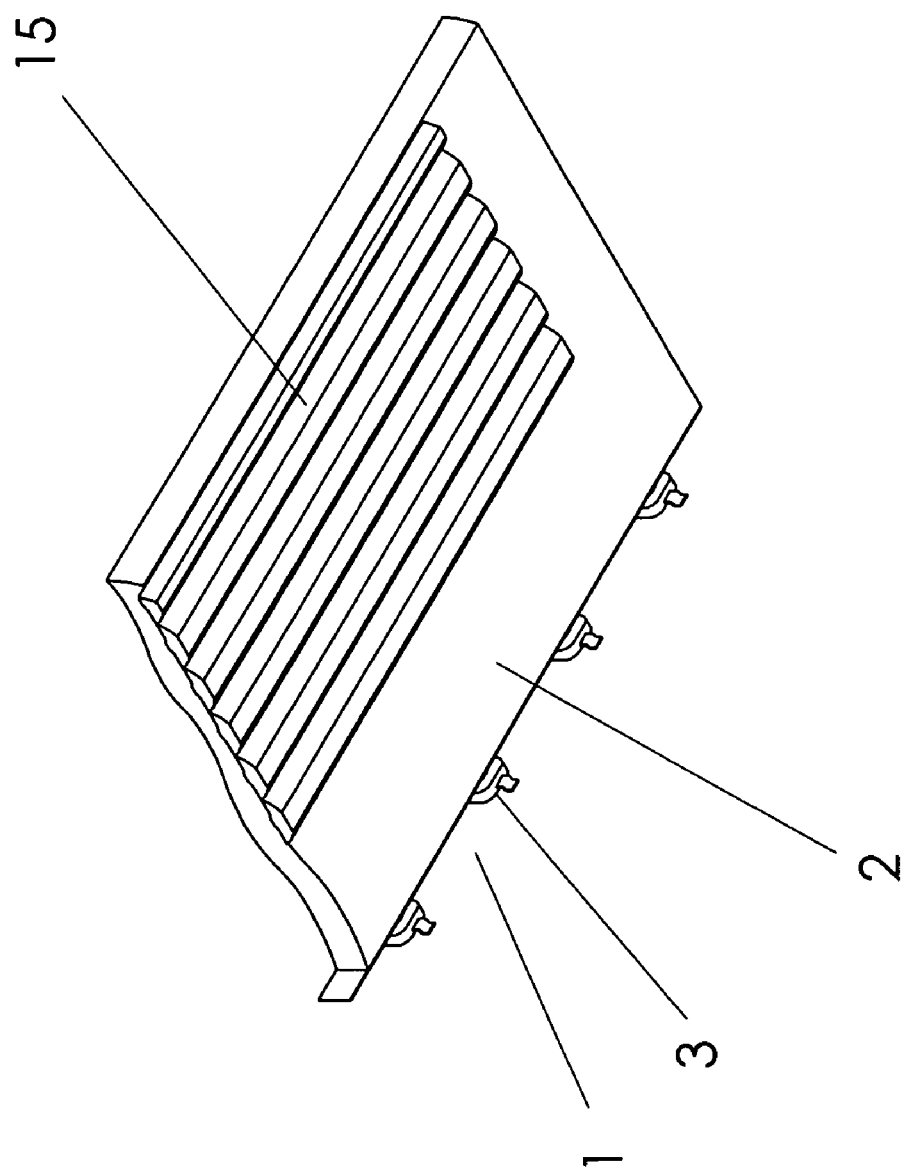
FIG. 4 shows two dimensional type reflectors.

Referring now to FIG. 3, the reflectors 15 are shown as three dimensional type reflectors. The reflectors 15 could as easily be selected to be two dimensional, linear type reflectors, such as that shown in FIG. 4. Again, the choice of which type of reflector 15 is used depends on the application being considered. A user could also select many combinations of reflector shapes, and could employ them in either a two dimensional or three dimensional type configuration. Both the two dimensional and the three dimensional reflectors are shown as an array of reflectors 15 in FIGS. 3 and 4. Those skilled in the art will recognize that many other types of reflector arrays could also be deployed.

FIG. 5 shows a magnified side view of the light guide 2, an LED 3, and the end reflectors 20 and 21. Light will often travel through the light guide from the LED 3 and not reflect off a contact dome 14 that is in an on position and therefore extracting light from the light guide 2. In that situation, the light would travel the full length of the light guide 2. When the light reaches the distal end of the light guide 2, the end opposite the LEDs 3, the light is reflected off the end reflector 21. The reflection redirects the light in the opposite direction through the light guide 2, back toward the originating LEDs 3. Preferably, the end reflector 21 is formed from a material with high reflectance. Interference type or metal reflectors are two possible alternatives for the end reflector 21. A third possibility would be an angled, retro type reflector.

If the light continues to travel in the light guide 2 without contacting one of the contact domes 14, the light will reach the originating end of the light guide 2, the end where the LEDs 3 are located. At this end of the light guide 2, the light will either strike the area between the LEDs 3 or it will strike the LEDs 3. When the light strikes the area between the LEDs 3, it will be reflected by the end reflector 20. If the light guide 2 has only a few LEDs 3, the light will almost always reflect off of the high reflectance end reflector 20. In the cases of the light reflecting off an LED 3, the LED 3 will absorb a portion of the light, and the remainder of the light will be reflected. Light may travel up and down the light guide 2 a number of times before it is extracted by a contact dome 14. This would be the case when there are only a few contact domes 14 in the particular light guide assembly 1. If many of the contact domes 14 were present in the light guide 2, the likelihood of light making more than one or two passes along the light guide 2 is small. Even in the case of a large number of reflections with the light making multiple passes along the light guide 2, the loss of light is small. The end reflectors 20, 21 have reflectance efficiencies of 98% or better, and good quality light guide material absorbs very little light.

Figure 6:
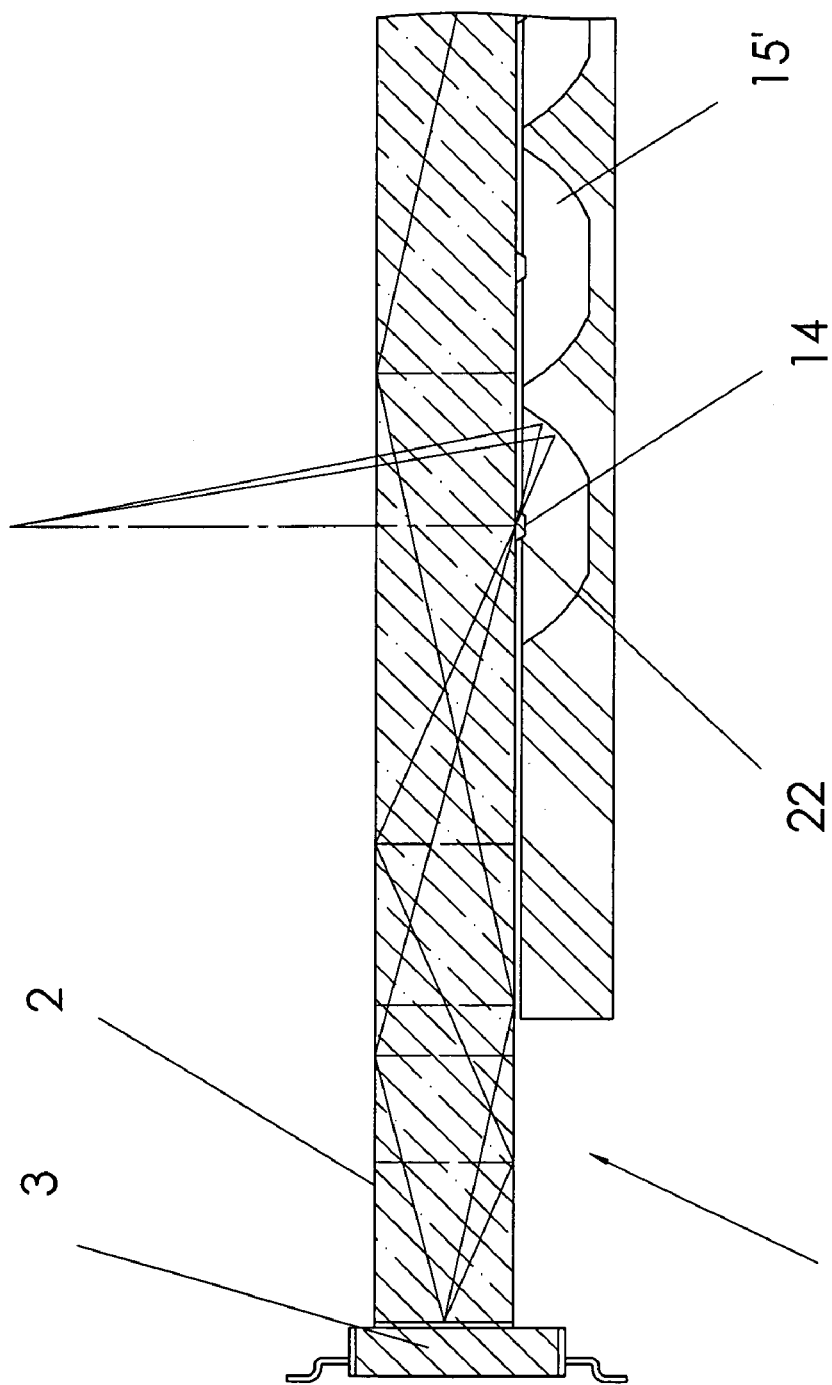
FIG. 6 is a partial, magnified side view of a different construction of the optic system.

An alternate configuration of the light guide assembly 1 is shown in FIG. 6, in which the reflectors 15 are hollow rather than made from a solid material as is typically the case. In this configuration, the contact dome 14 employs a tapered or spherical surface 22 so the upper reflected light 13 passes through the contact dome 14 and continues along a generally straight path toward the surface of the reflector 15 when the contact dome is in the on position. The function of the light guide assembly 1 illustrated in FIG. 6 is the same as for the guide assembly 1 illustrated in FIG. 2, the only difference being the utilization of hollow reflectors 15'.

Figure 7:
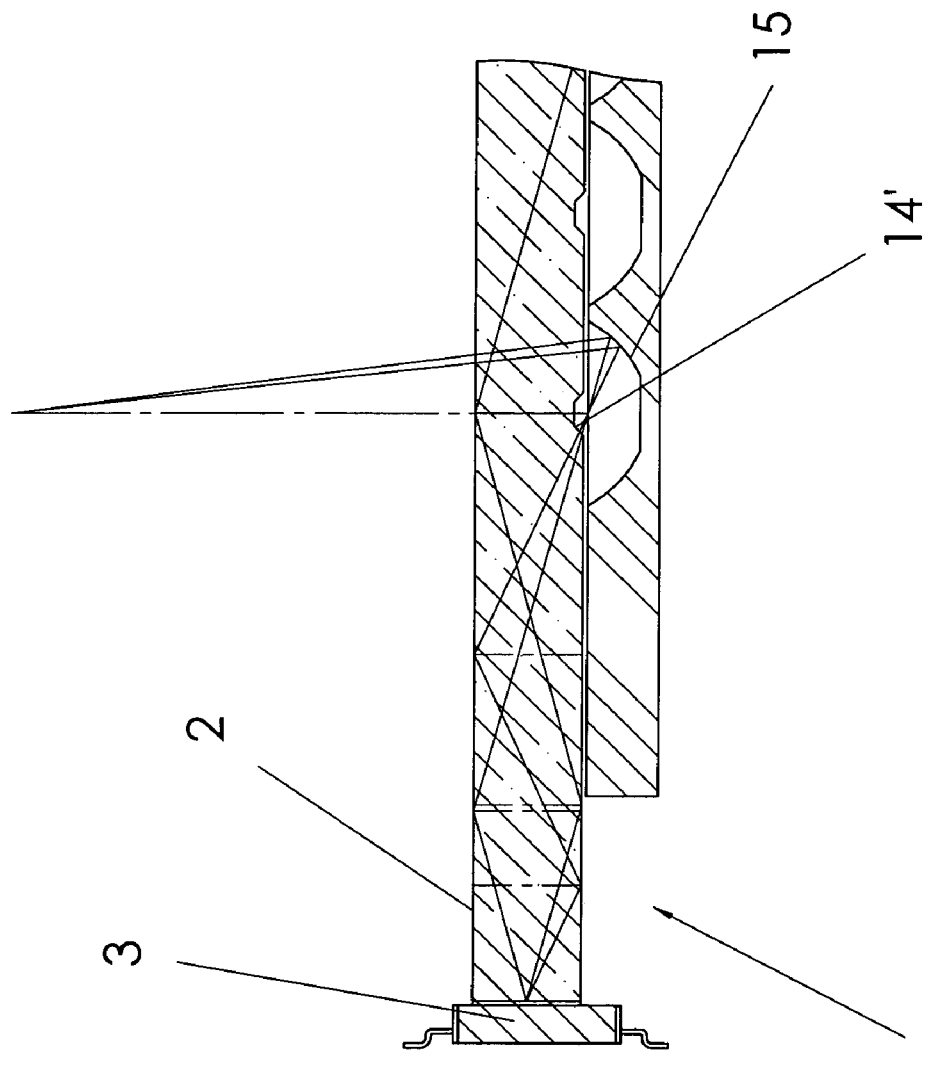
FIG. 7 shows a magnified side view of another construction of the optic system.

Another configuration of the light guide assembly 1 is illustrated in FIG. 7. In the configuration shown in FIG. 7, the features of the contact dome 14 are cut into the surface of the light guide 2. This configuration is, in effect, a negative of the configuration illustrated in FIG. 2. As with the assembly 1 shown in FIG. 6, the function of the light guide assembly 1 shown in FIG. 7 is the same as that shown in FIG. 2. Ease of manufacturing and desired output effects control which reflector construction is chosen for a given application.

Figure 8:
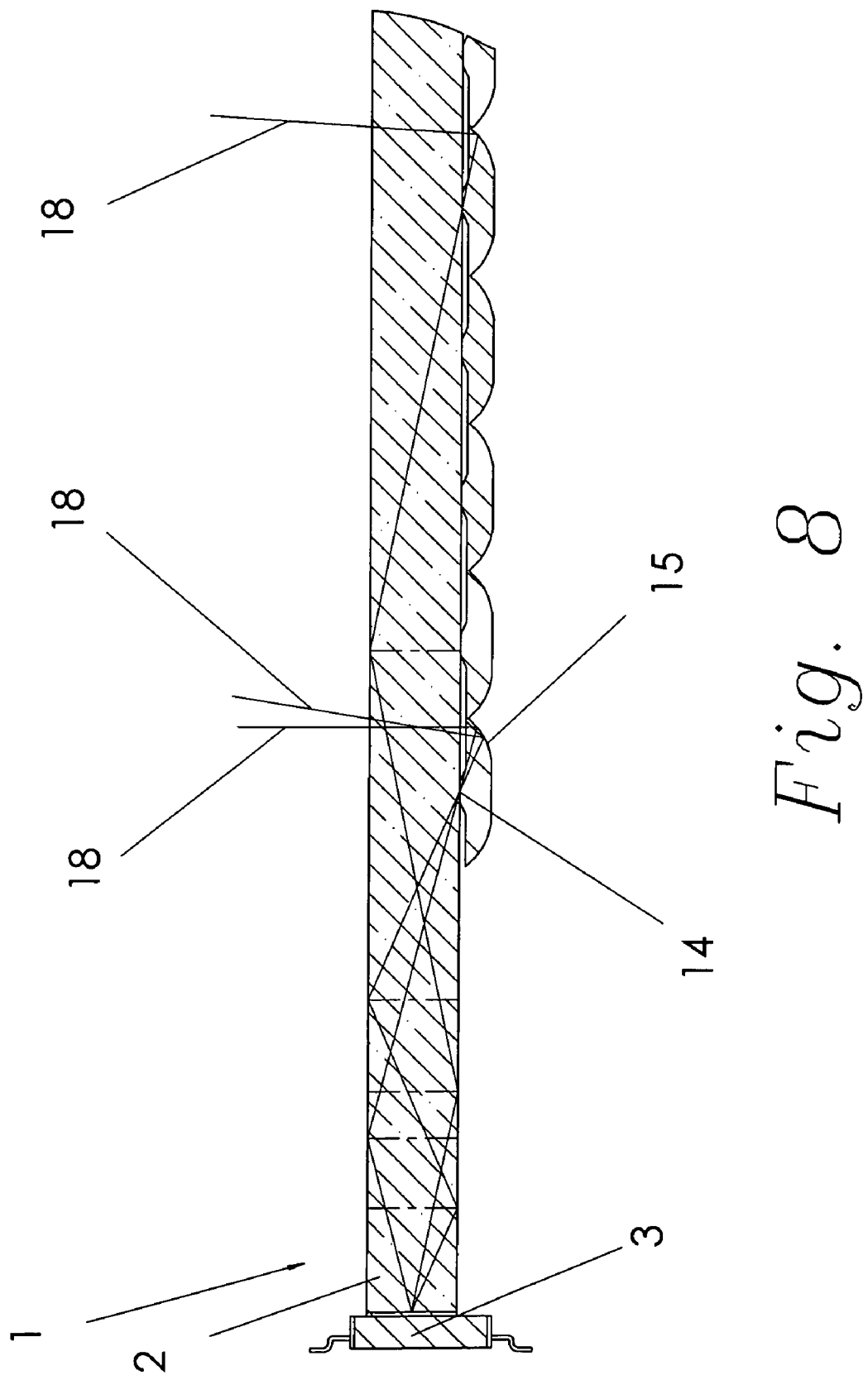
FIG. 8 illustrates an optic system utilizing a divergent type reflector.

FIG. 8 shows a configuration of the light guide assembly 1 in which the output light is spread as opposed to being directed to a focal point. As discussed above, the shape of the reflectors 15 controls the output effect of the light. In FIG. 8, the shape of the reflectors 15 is chosen to scatter the reflected light rays 18, as opposed to directing the light to a focal point.

FIG. 9 discloses an alternative method for optically isolating the reflector 15 structures from the light guide 2. In the configuration illustrated in FIG. 9, a thin layer 30 of a material with a low index of refraction separates the light guide 2 from the structure supporting the reflectors 15. The contact domes 14" are simply apertures in the thin, low index of refraction layer 30.

The thickness of the low index layer 30 in FIG. 9 is not to scale. In practice, the low index layer 30 would be only microns thick. The thin layer 30 can be deposited with a lithographic process. The reflectors 15 and contact domes 14" would then be molded in direct contact with the light guide 2 and the thin layer 30. Adhesive can be used as the low index material 30. Choosing an adhesive as the low index material 30 is often beneficial to the manufacturing process.

The above disclosure is not intended as limiting. Those skilled in the art will readily observe that numerous modifications and alterations of the device may be made while retaining the teachings of the invention. Accordingly, the above disclosure should be construed as limited only by the restrictions of the appended claims.

I claim:

1. A light guide system, comprising:
a light guide comprising a first major surface and a second major surface, wherein light travels along the light guide by total internal reflection at the major surfaces; and
light extracting and reflecting elements, each comprising:
a concave reflector facing the first major surface of the light guide to reflect light extracted from the light guide back through the light guide such that the light exits the light guide through the second major surface with a predetermined direction and pattern, the reflector being optically isolated from the light guide, and
a light extracting optical element at the first major surface of the light guide to selectively extract the light from the light guide towards the reflector, the light extracting optical element having a smaller lateral extent than the reflector in a plane parallel to the first major surface of the light guide.

2. The light guide system of claim 1, wherein:
the concave reflector is a parabolic reflector; and
in the plane parallel to the first major surface, the light extracting optical element is sufficiently small in comparison with the concave reflector that the light exits the second major surface as a parallel beam.

3. The light guide system of claim 2, wherein the solid body is greater than or equal to the light guide in refractive index.

4. The light guide system of claim 1, wherein the concave reflector and the light extracting optical element are respective parts of a solid body.

5. The light guide system of claim 4, wherein the solid body outside the light extracting optical element is optically isolated from the light guide by a gap filled with material lower in refractive index than the light guide.

6. The light guide system of claim 5, wherein the material is an adhesive.

7. The light guide system of claim 5, wherein the gap is an air gap.

8. The light guide system of claim 4, wherein the concave reflector comprises a convex exterior surface of the solid body.

9. The light guide system of claim 4, wherein the concave reflector comprises a concave interior surface of the solid body.

10. The light guide system of claim 1, wherein the light extracting optical element is a part of a solid body of which the concave reflector is also a part.

11. The light guide system of claim 10, wherein the light extracting optical element comprises a protrusion from the solid body.

12. The light guide system of claim 11, wherein the protrusion comprises a tapered or curved side surface.

13. The light guide system of claim 1, wherein the respective concave reflector and the light extracting optical element of more than one of the light extracting and reflecting elements are respective parts of a solid body.

14. The light guide system of claim 1, wherein the light extracting optical element comprises a recess extending into the light guide from the first major surface thereof.

15. The light guide system of claim 14, wherein the recess comprises a tapered or curved side surface.

16. The light guide system of claim 1, wherein the recess and the concave reflector are elongate in a direction parallel to the first major surface.

17. The light guide system of claim 1, wherein:
the light guide system additionally comprises a solid body;
the concave reflector comprises a surface of the solid body;

the light extracting element comprises a protrusion from the solid body opposite the concave reflector; and the light extracting optical element is affixed to the major surface of the light guide.

18. The light guide system of claim 17, wherein the solid body is greater than or equal to the light guide in refractive index.

19. The light guide system of claim 1, wherein the light extracting optical element is at a focal point of the concave reflector.

20. The light guide system of claim 1, wherein the light extracting optical element is equal to or greater than the light guide in refractive index.

21. The light guide system of claim 1, wherein the light extracting optical element is configured to extract the light from the light guide such that the light passes to the concave reflector along a generally straight path.

22. The light guide system of claim 1, wherein the light extracting optical element comprises a tapered or spherical side surface.

23. The light guide system of claim 1, wherein the concave reflector is an elliptical reflector.

24. The light guide system of claim 1, wherein the concave reflector is dome-shaped.

25. The light guide system of claim 1, wherein the concave reflector has a reflectance of 98% or greater.

26. The light guide system of claim 1, wherein the reflector is configured to direct the light towards the second major surface as a generally parallel beam.

27. The light guide system of claim 1, wherein, in the plane parallel to the first major surface, the light extracting optical element is less than one-half in lateral extent than the concave reflector.

28. The light guide system of claim 1, wherein, in the plane parallel to the first major surface, the light extracting optical element is less than one-tenth in lateral extent than the concave reflector.

29. The light guide system of claim 1, additionally comprising a light source to edge light the light guide.

30. The light guide system of claim 29, wherein the light source comprises a light emitting diode.

31. A liquid crystal display comprising the light guide system of claim 1.

* * * * *